United States Patent
Cagle et al.

(12)

(10) Patent No.: US 6,314,516 B1
(45) Date of Patent: Nov. 6, 2001

(54) METHOD AND APPARATUS FOR CONFIGURING COMMUNICATIONS SETTINGS IN A COMPUTER SYSTEM

(75) Inventors: John M. Cagle; Mark R. Potter, both of Houston; Mohana Rao Mullapudi, Cypress; Mark Simpson, Houston, all of TX (US); Wolfgang M. Neubauer, Munich (DE)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/474,586

(22) Filed: Dec. 29, 1999

Related U.S. Application Data

(60) Provisional application No. 60/168,912, filed on Dec. 3, 1999.

(51) Int. Cl.[7] ................................................. G06F 15/177
(52) U.S. Cl. ................................................. 713/1; 713/100
(58) Field of Search .................................... 713/1, 2, 100; 709/220, 221, 222

(56) References Cited

U.S. PATENT DOCUMENTS

| | | | | |
|---|---|---|---|---|
| 5,995,597 | * | 11/1999 | Woltz et al. | 379/93.24 |
| 6,012,088 | * | 1/2000 | Li et al. | 709/219 |
| 6,026,151 | * | 2/2000 | Bauer et al. | 379/115 |
| 6,049,826 | * | 4/2000 | Beser | 709/222 |

* cited by examiner

Primary Examiner—Dennis M. Butler
(74) Attorney, Agent, or Firm—Conley, Rose & Tayon, P.C.

(57) ABSTRACT

A method for configuring communications settings in a computer system is provided. The method includes receiving a configuration settings file. The configuration settings file includes global connection settings, a connection type, and connection type specific settings. A communications link is configured to address a service provider based on the global settings. An access device in the computer system is configured based on the connection type and the connection type specific settings.

26 Claims, 4 Drawing Sheets

METHOD AND APPARATUS FOR CONFIGURING COMMUNICATIONS SETTINGS IN A COMPUTER SYSTEM

SPECIFIC REFERENCE TO PROVISIONAL APPLICATION

The present application claims priority to provisional application Serial No. 60/168,912, filed Dec. 3, 1999, the entire text and figures of which are incorporated herein by reference without disclaimer.

BACKGROUND OF THE INVENTION

1. Field of the Invention

This invention relates generally to computer systems, and, more particularly, to a method and apparatus for configuring communications settings in a computer system.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

The interconnection of the various points on the computer network may be accomplished using a variety of known topologies. For example, common computer network topologies include the bus, star, and ring configurations. Furthermore, communication between the computers connected to the network may be accomplished using a variety of known protocols. For example, the connected computers may communicate using TCP/IP, SNA, and APPN.

Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. These requests may include requests for information residing on an external data store, such as the internet. The server may provide a single access path through which any of the client computers may access the internet. The server may be used to administer the network. For example, the server may be used to update user profiles, establish user permissions, and allocate space on the server for a plurality of clients connected to the network.

In many computer networks, a large amount of data may be stored on the server and accessed by the attached client computers. For example, each client computer may be assigned a variable amount of storage space on the server. The assigned storage spaces may be private (i.e., protected) or made available to other clients, and the assigned storage spaces may be used to store a variety of file types, such as documents, email messages, etc. Furthermore, the server may be used to save public data (i.e., data that does not necessarily have a specific owner but may be accessed by any number of clients.) For example, public folders (i.e., directories) may be created on the server, and the public folders may store data that relates to group projects, company information, or any other data that may require access from more than one client.

The administration of a server is often a complex task that requires a great deal of software and hardware knowledge on the part of the administrator. Certain businesses may desire the functional advantages offered by a server, but may lack the expertise to effectively administer the server. Although computer consultants may be capable of providing the expertise, they tend to be costly.

One common function performed by a server is to provide centralized internet access. Typically, the administrator must configure the server to interface with an internet service provider (ISP). Often, configuring the server to interface with the ISP is a complicated, time consuming consuming process that requires specialized knowledge on the part of the administrator. There are numerous hardware and software settings that must be properly configured. The number of connection types available from ISPs has increased due to the proliferation of broadband data services. A server might have a typical V90 modem connection, or alternatively a high bandwidth connection, such as an Integrated Services Digital Network (ISDN) connection or a Digital Subscriber Line (DSL) connection. Each of these connection types has a unique configuration. Also, if a modem connection is used, there are typically hardware settings on the modem that must be adapted based on the ISP being used. For example, one setting that must be configured is the country in which the ISP dial-up number is located. Each country has different regulations governing the use of telecommunication devices. The globalization of computer hardware and service industries has increased the likelihood that a given server may be used in a plurality of countries and that a particular ISP may also have dial-up numbers in a plurality of countries. As such, the proper country designation is important in configuring the server interface with the ISP.

One technique for simplifying the internet configuration process involves installing software received from the ISP to configure the internet settings. Such software programs have limitations. First, the known software applications are specific to Windows® operating systems offered by Microsoft Corporation. Second, these applications are only adapted to configure dial-up modem connections. They cannot be used to configure other connections such as ISDN or ADSL, which typically use an Ethernet connection rather than a dial-up phone line connection. Another limitation in the ISP configuration routines is that due to the wide variety of hardware that they might encounter, they cannot configure the setting specific to the modem (e.g., the country code). Typically, the server is provided by one vendor, and the internet connection is provided by a different vendor. The automatic approach described above only configures the connection from the viewpoint of the ISP. The administrator must still manually configure the connection based on their specific hardware configuration and connection type.

As a result of the limitations discussed above, a great deal of hardware and software knowledge is still required of the administrator. Accordingly, configuring the complete communications settings, including the connection type and modem-specific settings, is still a time-consuming process.

The present invention is directed to overcoming, or at least reducing the effects of, one or more of the problems set forth above.

SUMMARY OF THE INVENTION

One aspect of the present invention is seen in a method for configuring communications settings in a computer system.

The method includes receiving a configuration settings file. The configuration settings file includes global connection settings, a connection type, and connection type specific settings. A communications link is configured to address a service provider based on the global settings. An access device in the computer system is configured based on the connection type and the connection type specific settings.

BRIEF DESCRIPTION OF THE DRAWINGS

The invention may be understood by reference to the following description taken in conjunction with the accompanying drawings, in which like reference numerals identify like elements, and in which.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
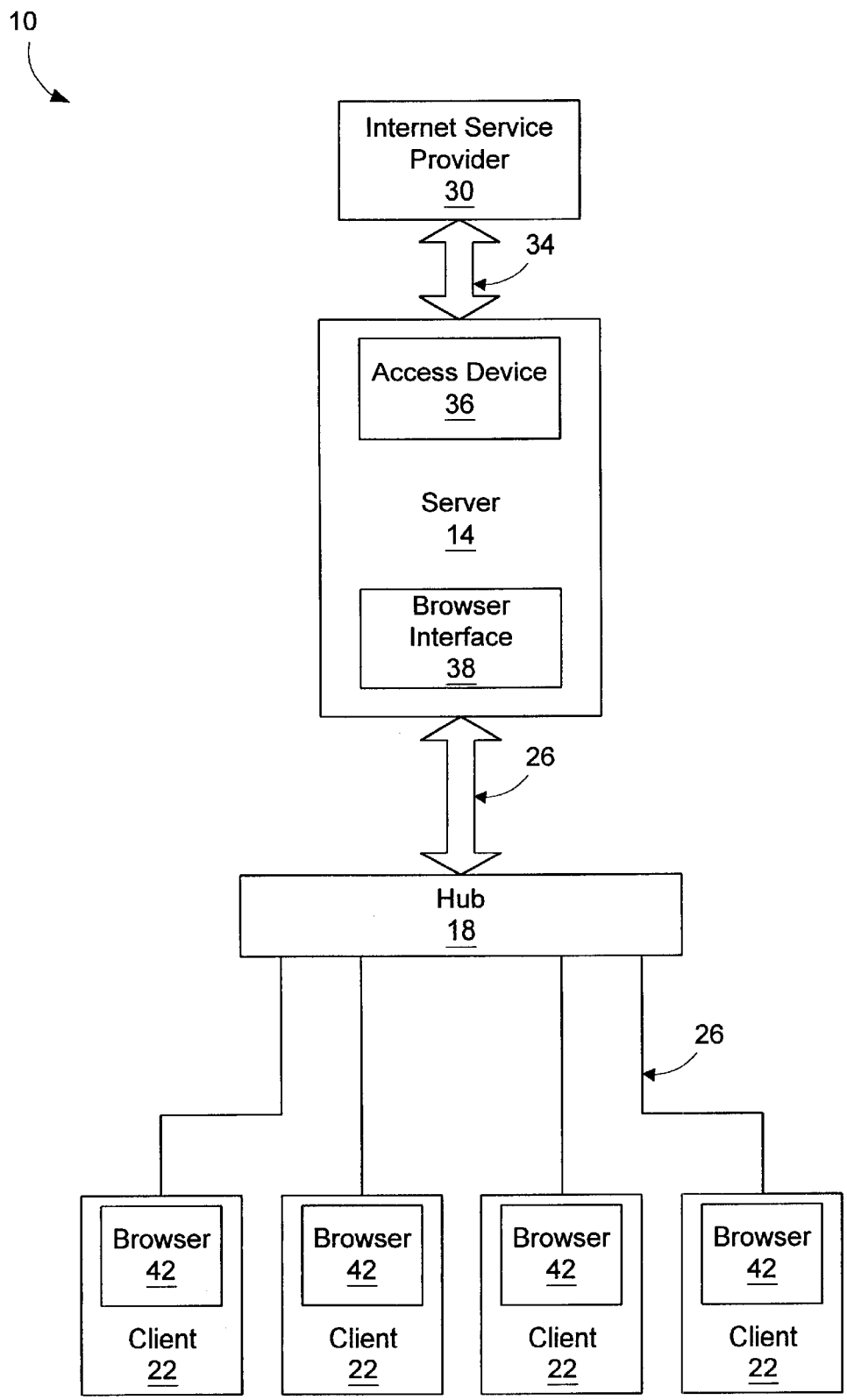
FIG. 1 is a simplified block diagram of a computer network in accordance with the present invention.

Referring to FIG. 1, a block diagram of a computer network 10 is shown. The computer network 10 may be configured using a variety of known topologies. For example, the computer network 10 may be configured as a ring, bus, or by any other known method of interconnecting computers. In one embodiment, the computer network 10 is configured using a star topology and comprises a server 14, a hub 18, and a plurality of clients 22 that are coupled to the hub 18. It is contemplated that the hub 18 may comprise of a variety of switching or routing devices, depending upon the particular application.

The hub 18 may be used as an intermediary between the server 14 and the clients 22. Generally, the hub 18 directs the flow of data between the server 14 and the clients 22. For example, each client 22 attached to the hub 18 may be identified by a unique address. Accordingly, based on the unique address, data may be routed from the server 14 to the appropriate client 22 through the hub 18. Furthermore, the hub 18 may control the flow of data from the clients 22 to the server 14 (i.e., the hub 18 may be a bi-directional device.) Moreover, the hub 18 may operate in conjunction with the server to transfer data between two clients 22.

Although only one hub 18 is shown in FIG. 1, it is contemplated that a plurality of hubs 18 may be included in the computer network 10, which may increase the number of clients 22 that may be attached to the network 10. For example, in one embodiment, each hub 18 may be coupled to seven clients 22. Once a hub 18 is at maximum capacity, an additional hub 18 may be attached to the filled hub 18 and seven additional clients 22 may be attached to the empty hub 18. It is contemplated that the network 10 may be designed to service any number of clients 22, and in one embodiment, three hubs 18 may be stacked, as described above, and the server 14 may be connected to twenty-five clients 22.

It is contemplated that a variety of protocols may be used to control the flow of data between the server 14 and the clients 22. For example, the server 14 and the clients 22 may transfer data using TCP/IP, SNA, APPN, or any other protocol adapted to facilitate the movement of data. In one embodiment, transferring data between the server 14 and the clients 22 requires client software operating on the clients 22 and server software operating on the server 14. The client software and the server software cooperate to transfer and receive data. For example, the sender (e.g., client 22 or server 14) may encapsulate data into a packet. The packet may include any additional information (e.g., addresses, etc.) that may be necessary to successfully transmit the packet across the network 10 to a receiver (e.g., client 22 or server 14.) The receiver may decapsulate the packet, removing any undesired information. Once decapsulated, the data contained in the packet may be processed.

The clients 22 may be personal computers (PCs). For example, the clients 22 may be IBM compatible PCs or Macintosh® computers. Moreover, each client 22 may include a network interface card (not shown) that provides the necessary hardware for data to be transferred to and from the network 10. In addition to the client software, each client 22 may include an operating system, such as Windows® 95/98, Windows® NT, MAC OS7/8, etc.

The server 14 may be connected to the hub 18 using a network interface card (not shown.) As with any connection in the network 10, network interface cables 26 may be used to interconnect devices on the network 10. For example, the electrical connection between the server 14 and the hub 18 may be established using coaxial cable, twisted pair cable, fiber optic cable, or any other material conducive to carrying a signal. In addition, it is contemplated that the server 14 may be connected to an internet service provider (ISP) 30 using a variety of hardware configurations, such as dial-up modem, ISDN, ADSL, etc., through a connection 34 and an access device 36.

In one embodiment, the server 14 may be "headless," requiring remote service and administration. For example, the server 14 may be placed in the network 10 without being connected to a keyboard, monitor, mouse, or any other user input/output devices. Such a headless configuration is ideally suited for use in a setting where the server 14 is treated more as an information appliance to enhance the network, rather than the central core of the network 10. For example, a small business using a simple peer-to-peer network 10 arrangement may wish to have additional services, such as e-mail, centralized internet access, common file storage and backup, file sharing, etc. Rather than using a more powerful, but more complicated, full-function server, the headless server 14 may be employed to provide the desired functionality without the overhead associated with the full-function server. Users of the headless server 14 may be less sophisticated computer users, and may desire an easily administered interface.

To service or administer the server 14, the server 14 may include a browser interface 38. For example, the server 14 may be accessed by any of the attached clients 22 using a browser 42, such as Microsoft Internet Explorer, Netscape Navigator, etc. The server 14 may be hard coded with a default IP address prior to being shipped to an end user. For example, the IP address 192.168.1.1 is a default dead net address from the Internet Assigned Numbers Authority (IANA) and may be used as an initial IP address. Once the network 10 is connected, the browser 42 that has been installed on the clients 22 may be pointed to the default IP address that has been designated in the server 14. Using the browser 42, the clients 22 may access a simple to use browser interface 38 that has been preloaded in the server containing a list of options for the server 14. The browser interface 38 may include a simple to use graphical user interface that allows the client 22 to easily access and customize the configuration of the server 14.

In one embodiment, to simplify configuring the initial setup of the clients 22 (e.g., configuring the browsers 42 to access the browser interface 38), a companion disk containing configuration software may be shipped with the server 14. The configuration software may be installed on the clients 22 simplifying the configuration of the individual browsers 42. Alternatively, it is contemplated that a network application program, such as TCP/IP, may be pre-installed on the clients 22 and the browsers 42 may be manually configured.

Figure 2:
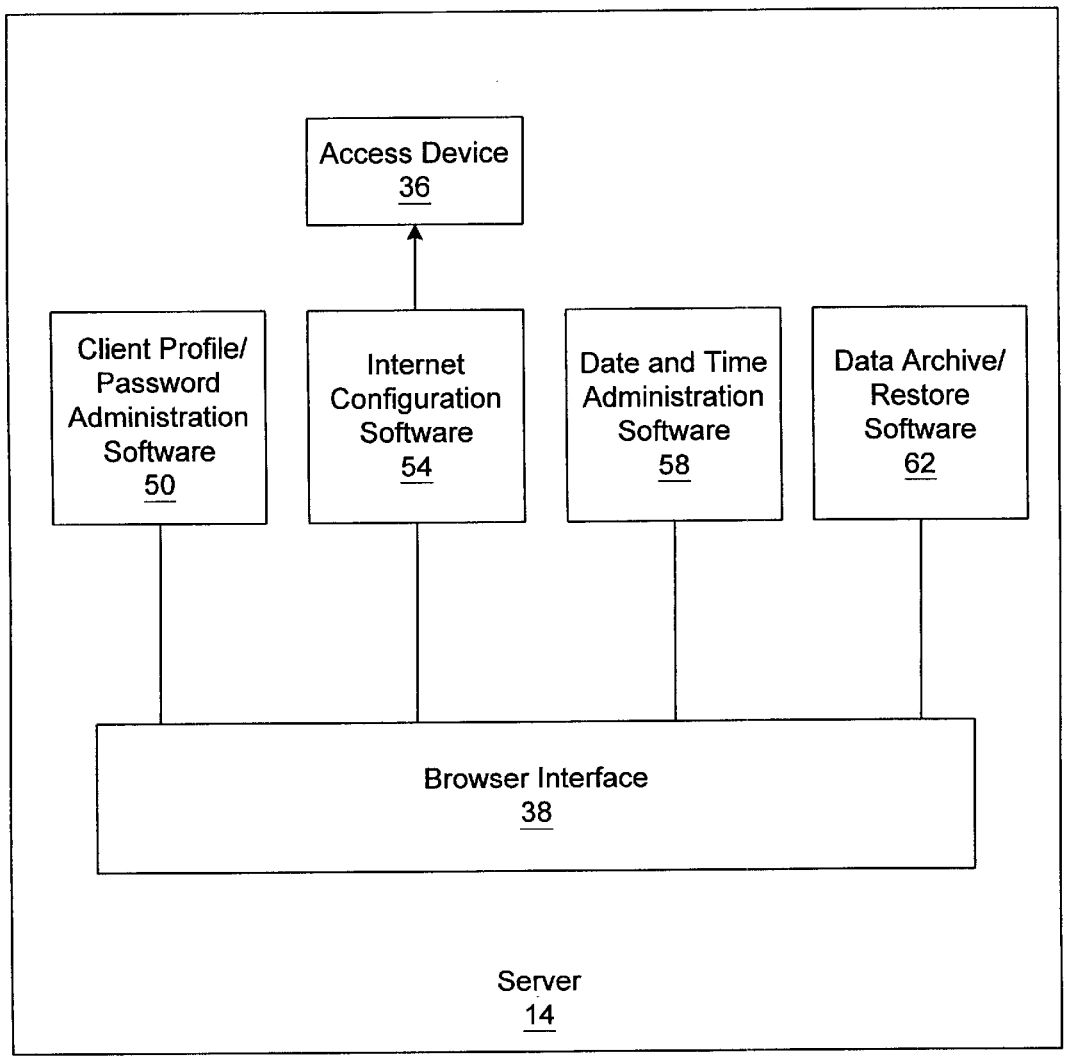
FIG. 2 is a diagram illustrating software applications executed by a server in the computer network of 1.

Referring to FIG. 2, a block diagram illustrating examples of various administration features that may be accessed using the browser interface 38 of the server 14 is provided. As described above, the browser interface 38 may be used in conjunction with the browsers 42 of the clients 22 to simplify the administration, configuration, and customization of the server 14. It is contemplated that, depending upon the particular application, additional features may be added and administrated using the browser interface 38 described above. In one embodiment, the browser interface 38 installed on the server 14 may include client profile and password administration software 50, internet configuration software 54, date and time administration software 58, and data archiving and restoration software 62.

As illustrated above, the server 14 may be interconnected with the clients 22 in the network 10. Before the clients 22 may access resources available on the server 14, each user is identified by a user profile that may be protected with a user password. It is contemplated that the first client 22 connected to the network 10 may access the server 14 via its browser 42 and the browser interface 38 using an administration profile and password provided by the manufacturer. Once the administrator has accessed the server 14, the administration profile and password may be changed, and the other users may be assigned user profiles and passwords. User profiles and passwords may be added, deleted, and changed as often as desired. Moreover, any user that has accessed the server 14 using the administration profile and password may have access to the administration features of the software 50, 54, 58, and 62 on the server 14.

Using the browser interface 38 and the administration profile and password, any client 22 may access the internet configuration software 54 and configure the server 14 with the appropriate internet settings. The operation of the internet configuration software 54 for configuring the connection to the ISP 30 is discussed in greater detail below. Depending upon the desired internet usage, individual users may be granted internet access while other users connected to the network may be denied internet access.

The date and time administration software 58 allows a user to access the current date, time, and time zone set for the server 14 by the manufacturer, since the default information for these items is many times incorrect for the particular user. The browser interface 38 in conjunction with the administrator profile and password allows the information to be updated reflecting the locale of the user.

The data archiving and restoration software 62 may be used to backup data stored on the primary and expansion storage devices (not shown). Using the browser interface 38, a data archive schedule may be configured to automatically archive the data saved on the primary and expansion storage devices (not shown) onto a backup storage device (not shown). For example, the administrator may configure the settings of the server 14 to select an automated backup routine.

Figure 3:
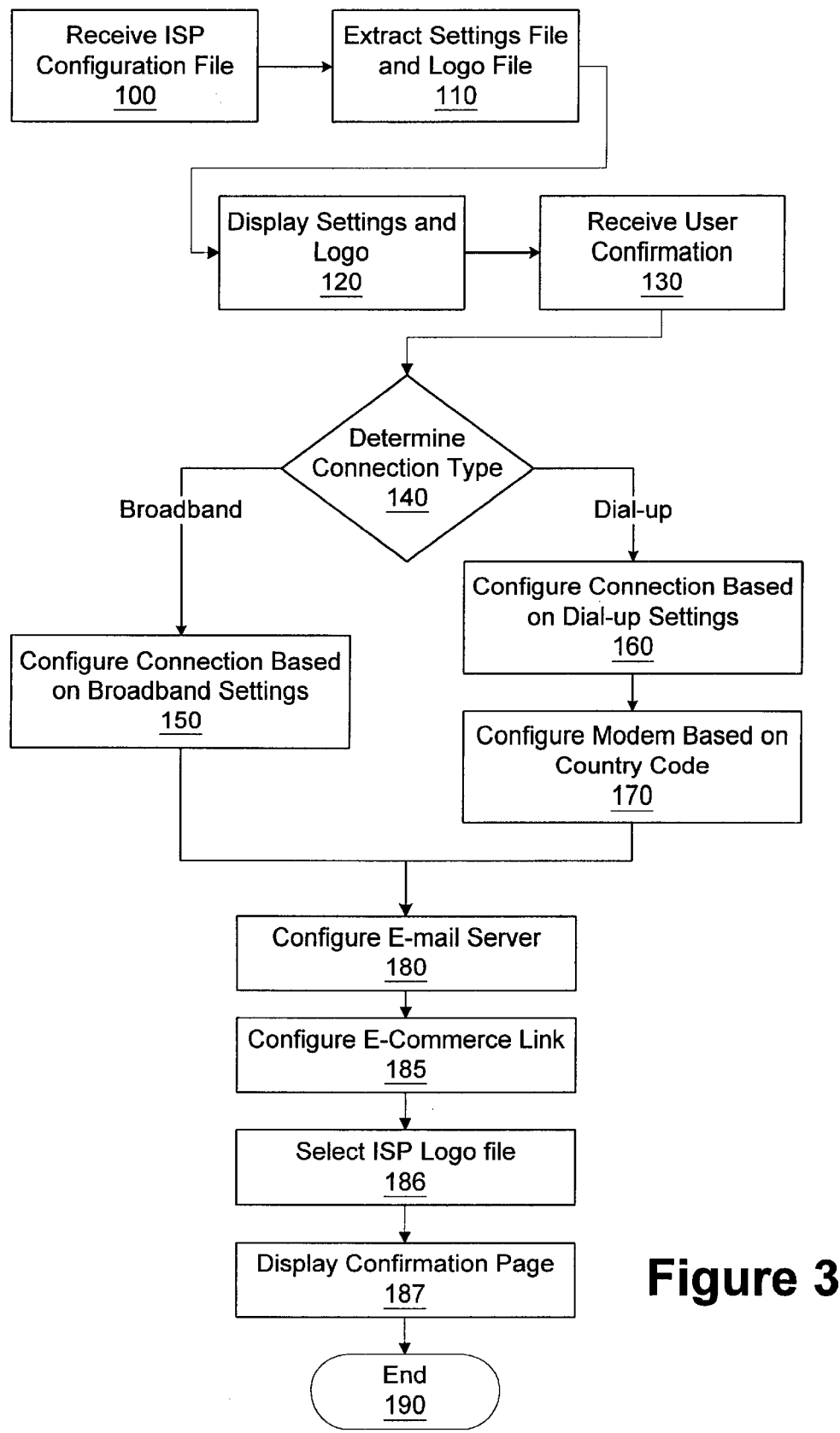
FIG. 3 is a flow diagram illustrating a method for configuring communications settings in a computer system in accordance with the present invention.

As will be discussed in greater detail below, FIG. 3 illustrates a flow diagram of a method for configuring communications settings in a computer system. The method described in FIG. 3 is implemented by the internet configuration software 54. As seen in FIG. 1, the server 14 receives an ISP configuration file 70 containing communication information related to configuring the connection 34 between the server 14 and the ISP 30. The ISP configuration file 70 may be provided via removable storage medium such as a floppy disk or a CD-ROM. Alternatively, the administrator may be able to download the ISP configuration file from the web site of the ISP 30.

Figure 4:
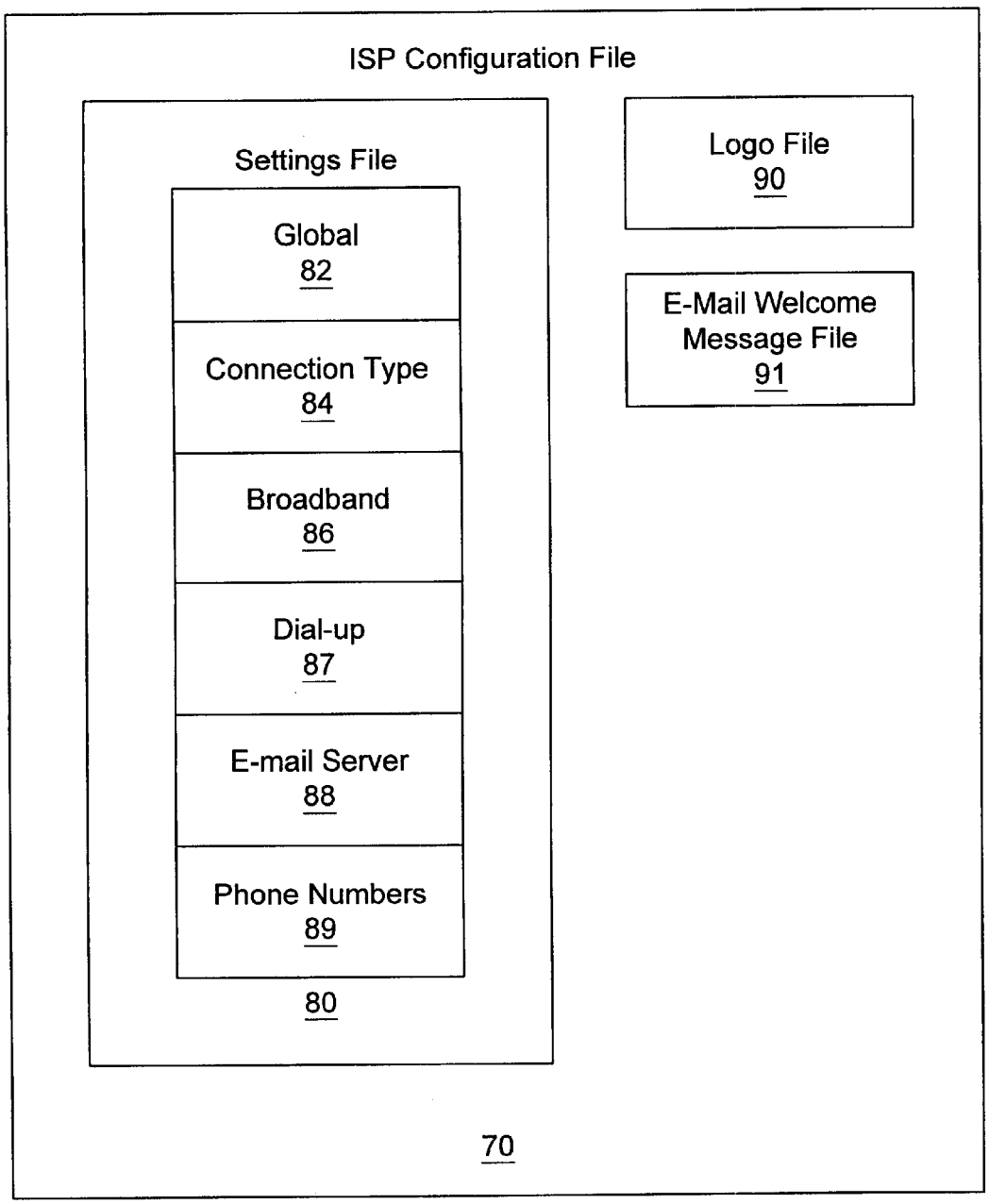
FIG. 4 is a diagram illustrating the contents of an ISP configuration file used in the performance of the method of claim 3.

Turning first to FIG. 4, a diagram of the contents of the ISP configuration file 70 is provided. In the illustrated embodiment, the ISP configuration file 70 is an archive file (e.g., ISP.ZIP). The ISP configuration file 70 includes a settings file 80 (e.g., ISP.INI), a logo file 90 (e.g., ISP.GIF), and an e-mail welcome message file 91 (e.g, WELCOME.TXT). The settings file 80 is a text file, the logo file 90 is a graphical image such as a GIF or JPEG image of a particular size and resolution, and the e-mail welcome message file 91 is a text file. An exemplary settings file 80 is provided below in Appendix A.

The settings file 80 includes communications configuration information divided into several headings. The first section of the settings file 80 includes a global section 82. The global section 82 includes general settings concerning the ISP 30, including provider name, home page address, technical support phone number, customer service phone number for coverage area, e-commerce link, post office protocol (POP) mail server name, simple mail transfer protocol (SMTP) mail server name, network news transfer protocol (NNTP) server name, primary domain name server (DNS) address, and secondary DNS address. These global settings define the connection from the ISP 30 side, regardless of the type of connection used by the customer (i.e., owner of the server 14). These settings were traditionally entered manually by the administrator of the server 14 or came in a configuration file supplied by the ISP 30 assuming a dial-up modem connection was being used. As stated above such configuration techniques only established the global settings and were operating system dependent.

The second section of the settings file 80 is a connection type section 84. In the illustrated embodiment, the connection type possibilities are modem, ISDN, and broadband. Broadband connections include high bandwidth cable and ADSL modems, for example. The next two sections of the settings file 80 include configuration information applicable to the particular connection type.

Typically, broadband connections use an Ethernet interface (not shown) of the server 14 rather than a phone line connection. A broadband section 86 of the settings file 80 specifies settings specific to this configuration. The broadband settings include a dynamic host connection protocol (DHCP) flag. Static IP address, netmask, and default gateway fields are provided for instances where DHCP is off.

A dial-up section 87 of the settings file 80 includes configuration information useful if the connection to the ISP is to be either a modem or ISDN connection. The dial-up settings include an automatic DNS flag, a multilink flag (i.e., on if the full 128 kb capacity of the ISDN line is to be used), and an account user name and password for the user provided by the ISP 30.

An e-mail server settings section 88 includes settings for configuring the e-mail server software of the server 14. The e-mail server settings include an e-mail server user name and password, an e-mail domain name for the server 14, a mail mode type, and scheduling information indicating how often the server 14 will check for new mail messages.

The final section of the settings file 80 is a dial-up phone number section 89 including information that allows the ISP 30 to give the user options for selecting a particular phone number to dial to reach the ISP 30 from their particular location. The phone number information includes a country code, state/province, city, and phone number in a predetermined format. In the illustrated embodiment, ISO 3166 country codes are used for standardization.

The particular configuration information included in the settings file 80 described above is provided for illustrative purposes. More or less configuration information may be provided depending on the particular application.

Returning to FIG. 3, the ISP configuration file 70 is received in block 100. For example, the administrator may insert a floppy disk or CD-ROM containing the ISP configuration file 70 into a drive on the server 14. The administrator may be prompted to insert the disk through administration option screens viewed using the browser interface 38.

The settings file 80, the logo file 90, and the e-mail welcome message file 91 are extracted (e.g., by the server 14) in block 110. A setting summary is displayed in block 120. In the illustrated embodiment, the setting summary is graphically displayed through the browser interface 38. The logo of the ISP 30 contained in the logo file 90 is displayed concurrently with the setting summary. The administrator is given an opportunity to manually change the settings displayed or proceed with the configuration. Typically, the administrator might modify the username, password, or specific dial-up phone number selection prior to proceeding. A user confirmation is received in block 130 and configuration of the server 14 commences.

The connection type is determined in block 140 based on the connection type section 84 of the settings file. If the connection type is determined to be broadband (ie., the access device 36 is a cable or DSL modem) in block 140, the access device 36 is configured based on the broadband section 86 in block 150. Otherwise, the access device 36 is configured based on the dial-up section 87 in block 160 (i.e., the access device 36 is a V90 modem or ISDN device). Both the broadband and dial-up configurations 150, 160 use information in the global section 82. If the connection was configured as a dial-up connection in block 160, the access device 36 is configured in block 170 based on the country code information contained in the dial-up phone number section 89. After configuration with the settings appropriate to the configuration type, the e-mail server is configured based on the e-mail server section 88 in block 180. The e-mail welcome message file 91 is used to generate a welcome message when the administrator first accesses the e-mail client. The e-commerce link is configured in block 185, the ISP logo is selected (ie., from the logo file 90) in block 186, and a confirmation page is displayed in block 187. The procedure ends in block 190.

The flexible configuration scheme described above has numerous advantages. First, because of the standard formats of the ISP configuration file 70, settings file 80, and logo file 90 the configuration is not operating system dependent. The predetermined format allows the vendor of the server 14 to partner with a variety of ISPs 30 to provide greater flexibility to the end user of the server 14. An application program may be provided to the ISP 30 by the server vendor to allow the ISP 30 to automatically create a properly formatted settings file 80 based on a series of graphical input screens. This simplifies the process of the ISP 30. After configuration, the logo file 90 may be employed on various administration screens available to the administrator to maintain the visibility of the server vendor and the ISP vendor. The logo can be displayed and configured such that when the administrator clicks on the logo with a mouse or other pointing device, a link is established to the web site of the ISP 30.

The combination of features described above simplifies the configuration process for the administrator of the server 14 as all of the configuration information may be supplied by the ISP 30 and/or the server vendor. Little specialized knowledge is required of the administrator. The simplicity of the configuration, given the general perception in the field that such configurations are complex and time-consuming, enhances the business image of the server vendor and ISP 30 in the eyes of the administrator. Additionally, both the server vendor and the ISP 30 benefit from the standardization and completeness of the configuration information due to reductions in the amount of technical support resources previously required to walk inexperienced users through the configuration process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

APPENDIX A

[GLOBAL_SETTINGS]

;Service Provider or Reseller Name

Provider_Name="Joe Bob Computer, Inc."

;In addition, the ISP Provider's logo should be placed as LOGO.GIF in the isp.zip file.

;URL for Partner home page

Provider_Homepage="HTTP://WWW.COMPAQ.NET/"

;Telephone number for support issues

Provider_Support_Phone="1-800-555-1212"

```
;Coverage Area Provider services
Provider_Coverage_Area="1-800-555-1212"
;Customized E-commerce link
E_Commerce_link=HTTP://WWW.COMPAQ.NET
;POP3 mail server
POP3=pop.flash.net
;SMTP mail server
SMTP=mail.flash.net
;NNTP news server
NNTP=news.flash.net
;Specify PRIMARY DNS SERVER ADDRESS. (Not
   needed if using AUTO_DNS or DHCP)
PRIMARY=209.30.0.9
;Specify SECONDARY DNS SERVER ADDRES, if it
   exists, otherwise comment out SECONDARY. (Not
   needed if using AUTO_DNS or DHCP).
SECONDARY=209.30.0.100
[CONNECTION_TYPE]
   ;Use MODEM, ISDN, BROADBAND
   TYPE=MODEM
   ;Specify the Description of the service
   DESCRIPTION="V.90 56K Dialup"
[BROADBAND]
   These settings are used if providing high-speed connec-
tivity to the customer using the NeoServer's broadband
Ethernet interface (such as ASDL or Cable Modem). A static
IP address will be supported.
   ;DHCP is either ON or OFF for the broadband interface
   DHCP=ON
   ;Supply Static IP address if DHCP is Off
   STATIC_IP_ADDRESS=192.23.22.11
   ;Supply netmask if DHCP is Off
   NETMASK=255.255.0.0
   ;Supply default gateway if DHCP is Off
   DEFAULT_GATEWAY=192.23.0.0
[DIALUP_PPP]
   These settings are used if you are providing ISDN/
      Modem connectivity to the customer using the Neo-
      Server's Dialup adapter (e.g. V.90 Modem, ISDN).
   This determines the type of DNS address resolution.
   ;Use OFF for Manual, or ON for automatic (RFC 1877)
   AUTO_DNS=OFF
   ;If you need full 128 kb band width then set ISDN_
      MULTILINK_PPP=ON
   ISDN_MULTILINK_PPP=OFF
   ;Account name provided by the ISP. (Optional, comment
      out Name lines if not needed.)
   PPP_USERNAME="John Doe"
   ;Account password provided by the ISP. (Optional, com-
      ment out Password lines if not needed.)
   PPP_PASSWORD="password"
[EMAIL_SETTINGS]
   ;Email Domain Name
   ;Example:mycompany.myisp.com,Mycompany.net,
      myisp.com, etc.
   MAILDOMAIN=
   ;Email Mail Mode
   ;Email Mail Mode can be Local, Single, Multi or Full
   MAILMODE=single
   ;Email User Name
   ;Email User Name is applicable only if Email Mail Mode
      is Multi
   MDUSER=JohnDoe
   ;Email User Password
   ;Email User Password is applicable only if Email Mail
      Mode is Multi
   MDPASS=Password
   ; Email Scheduling
   ; Email Scheduling can be X_TIMES_PER_DAY or
      EVERY_N_MINUTES
   MAILCHECK=EVERY_N_MINUTES
   ;EVERY_N_MINUTES is selected, Minimun frequency
      of mail checking is 5 minutes
   ;and Maximum is 999 minutes.
   MAILCHECK_MINUTES=60
   ;If X_TIMES_PER_DAY is selected, Email Scheduling
      can be Sunday, Monday,
   ;Tuesday, Wednesday, Thursday, Friday, or Saturday
   ; If day selection is either ON or OFF.
   ; Example: if you select SUNDAY then Selection is ON
      otherwise it is OFF
   MAILCHECK_SUNDAY=OFF
   MAILCHECK_MONDAY=OFF
   MAILCHECK_TUESDAY=OFF
   MAILCHECK_WEDNESDAY=OFF
   MAILCHECK_THURSDAY=OFF
   MAILCHECK_FRIDAY=OFF
   MAILCHECK_SATURDAY=OFF
   ;If X_TIMES_PER_DAY is selected, Email Scheduled
      check times in the 24 hour format
   ;You can specify up to 5 times during the day to check
      email."
   ;Use 'OFF' to disable a particular time."
   MAILCHECK_SCHEDULED_TIME1=08:00
   MAILCHECK_SCHEDULED_TIME2=09:00
   MAILCHECK_SCHEDULED_TIME3=14:00
   MAILCHECK_SCHEDULED_TIME4=Off
   MAILCHECK_SCHEDULED_TIME5=Off
[PPP_PHONE_NUMBERS]
   ;ISP dial-up phone numbers
   ;FORMAT: Country Code, State/Province, City, Phone
      Number(comma eliminated)
   ;Failure to follow the specified format can result in
      unexpected behavior
   USA,Texas,Houston-V.90,7133138289
   USA,Texas,Houston-28.8,7133138289
   DEU,Bayem,Munchen,054748122
```

What is claimed:

1. A method for configuring communications settings in a computer system, comprising:

prompting a user for a configuration settings file, the configuration settings file including global connection settings, a connection type, and connection type specific settings;

accessing the configuration settings file;

configuring a communications link to address a service provider based on the global settings; and configuring an access device in the computer system based on the connection type and the connection type specific settings.

2. The method of claim 1, wherein the connection type specific settings include broadband settings, and the method further includes configuring the access device based on the broadband settings in response to the connection type being a broadband type.

3. The method of claim 2, wherein configuring the access device comprises configuring at least one of a cable modem and a digital subscriber line modem.

4. The method of claim 1, wherein the connection type specific settings include dial-up settings, and the method further includes configuring the access device based on the dial-up settings in response to the connection type being a dial-up type.

5. The method of claim 4, wherein the connection type specific settings further include phone number information, and the method further comprises configuring the access device based on the phone number information.

6. The method of claim 5, wherein the phone number information includes a country code, and configuring the access device includes configuring the access device based on the country code.

7. The method of claim 4, wherein configuring the access device comprises configuring at least one of a dial-up modem and an ISDN device.

8. The method of claim 1, further comprising:
receiving a logo file; and
displaying the logo file and a summary of the settings in the configuration settings file on a display of the computer system.

9. The method of claim 8, wherein the logo file and the configuration setting file are contained in an archive file, and the method further comprises extracting the logo file and the configuration setting file from the archive file.

10. The method of claim 8, further comprising receiving a user confirmation after displaying the summary and proceeding with the configuring of the communications link and the configuring of the access device in response to receiving the user confirmation.

11. The method of claim 1, wherein the configuration settings file includes e-mail server settings, and the method further includes configuring an e-mail server based on the e-mail server settings.

12. A computer system, comprising:
an access device for communicating with a service provider;
a processor; and
a program storage device encoded with instructions that, when executed by the processor, perform a method for configuring communications settings in a computer system, the method comprising:
prompting a user for a configuration settings file, the configuration settings file including global connection settings, a connection type, and connection type specific settings;
accessing the configuration settings file;
configuring a communications link to address the service provider based on the global settings; and
configuring the access device in the computer system based on the connection type and the connection type specific settings.

13. The computer system of claim 12, wherein the connection type specific settings include broadband settings, and the method further includes configuring the access device based on the broadband settings in response to the connection type being a broadband type.

14. The computer system of claim 13, wherein configuring the access device in the method comprises configuring at least one of a cable modem and a digital subscriber line modem.

15. The computer system of claim 12, wherein the connection type specific settings include dial-up settings, and the method further includes configuring the access device based on the dial-up settings in response to the connection type being a dial-up type.

16. The computer system of claim 15, wherein the connection type specific settings further include phone number information, and the method further comprises configuring the access device based on the phone number information.

17. The computer system of claim 16, wherein the phone number information includes a country code, and configuring the access device includes configuring the access device based on the country code.

18. The computer system of claim 15, wherein configuring the access device comprises configuring at least one of a dial-up modem and an ISDN device.

19. The computer system of claim 12, wherein the global settings include at least one of a provider name, home page address, technical support phone number, customer service phone number for coverage area, post office protocol (POP) mail server name, simple mail transfer protocol (SMTP) mail server name, network news transfer protocol (NNTP) server name, primary domain name server (DNS) address, and secondary DNS address.

20. The computer system of claim 12, wherein the broadband settings include at least one of a dynamic host connection protocol (DHCP) flag, static IP address, netmask, and default gateway.

21. The computer system of claim 12, wherein the dialup settings include at least one of an automatic DNS flag, a multilink flag, an account username, and an account password.

22. The computer system of claim 12, wherein the computer system further comprises a display, and the method further comprises:
receiving a logo file; and
displaying the logo file and a summary of the settings in the configuration settings file on the display.

23. The computer system of claim 22, wherein the logo file and the configuration setting file are contained in an archive file, and the method further comprises extracting the logo file and the configuration setting file from the archive file.

24. The computer system of claim 22, further comprising receiving a user confirmation after displaying the summary and proceeding with the configuring of the communications link and the configuring of the access device in response to receiving the user confirmation.

25. A computer system, comprising:
means for prompting a user for a configuration settings file, the configuration settings file including global connection settings, a connection type, and connection type specific settings;
means for accessing the configuration settings file;
means for configuring a communications link to address a service provider based; on the global settings; and
means for configuring an access device in the computer system based on the connection type and the connection type specific settings.

26. A program storage device programmed with instructions that, when executed by a computer system having an access device, perform a method for configuring communications settings, comprising:
prompting a user for a configuration settings file, the configuration settings file including global connection settings, a connection type, and connection type specific settings;
accessing the configuration settings file;
configuring a communications link to address a service provider based on the global settings; and
configuring the access device in the computer system based on the connection type and the connection type specific settings.

* * * * *